United States Patent [19]
Loudon

[11] 3,992,169
[45] Nov. 16, 1976

[54] REFRIGERATED CRYOGENIC ENVELOPE

[75] Inventor: John D. Loudon, Boulder, Colo.

[73] Assignee: Cryogenic Technology, Inc., Denver, Colo.

[22] Filed: Apr. 18, 1975

[21] Appl. No.: 569,491

[52] U.S. Cl. .................................. 62/55; 138/112; 138/113; 165/81; 174/15 S; 285/47; 285/DIG. 5
[51] Int. Cl.² .......................................... F17C 7/02
[58] Field of Search ............ 62/45, 55, 505; 285/47, 285/DIG. 5; 138/111, 112, 113, 114, 118, 124, 129; 174/15 S, 15 C; 165/81

[56] References Cited
UNITED STATES PATENTS

| | | | |
|---|---|---|---|
| 2,930,592 | 3/1960 | Long et al. | 165/81 X |
| 3,068,026 | 12/1962 | McKamey | 285/47 |
| 3,137,143 | 6/1964 | Jacobs et al. | 62/45 |
| 3,399,691 | 9/1968 | Schoch et al. | 62/55 X |
| 3,466,886 | 9/1969 | Doose et al. | 62/55 |

*Primary Examiner*—William F. O'Dea
*Assistant Examiner*—Ronald C. Capossela
*Attorney, Agent, or Firm*—Griffin, Branigan & Butler

[57] ABSTRACT

An elongated cryogenic envelope including an outer tube and an inner tube coaxially spaced within said inner tube so that the space therebetween forms a vacuum chamber for holding a vacuum. The inner and outer tubes are provided with means for expanding or contracting during thermal changes. A shield is located in the vacuum chamber intermediate the inner and outer tubes; and, a refrigeration tube for directing refrigeration to the shield is coiled about at least a portion of the inner tube within the vacuum chamber to permit the refrigeration tube to expand or contract along its length during thermal changes within said vacuum chamber.

8 Claims, 21 Drawing Figures

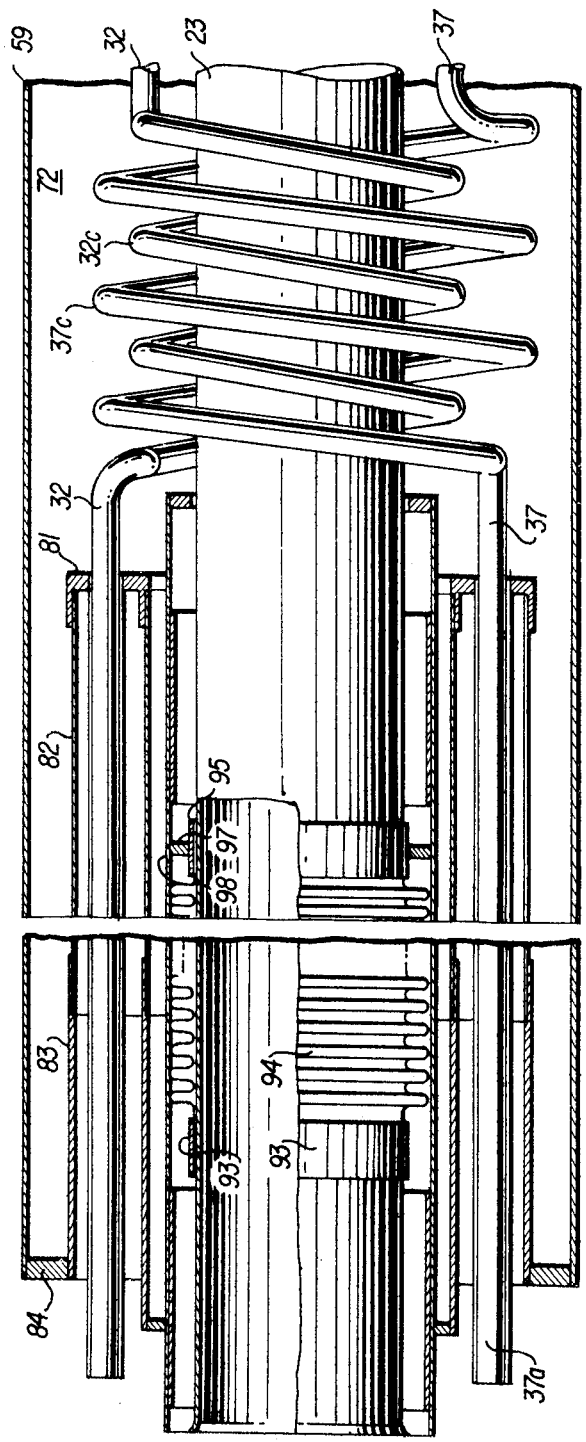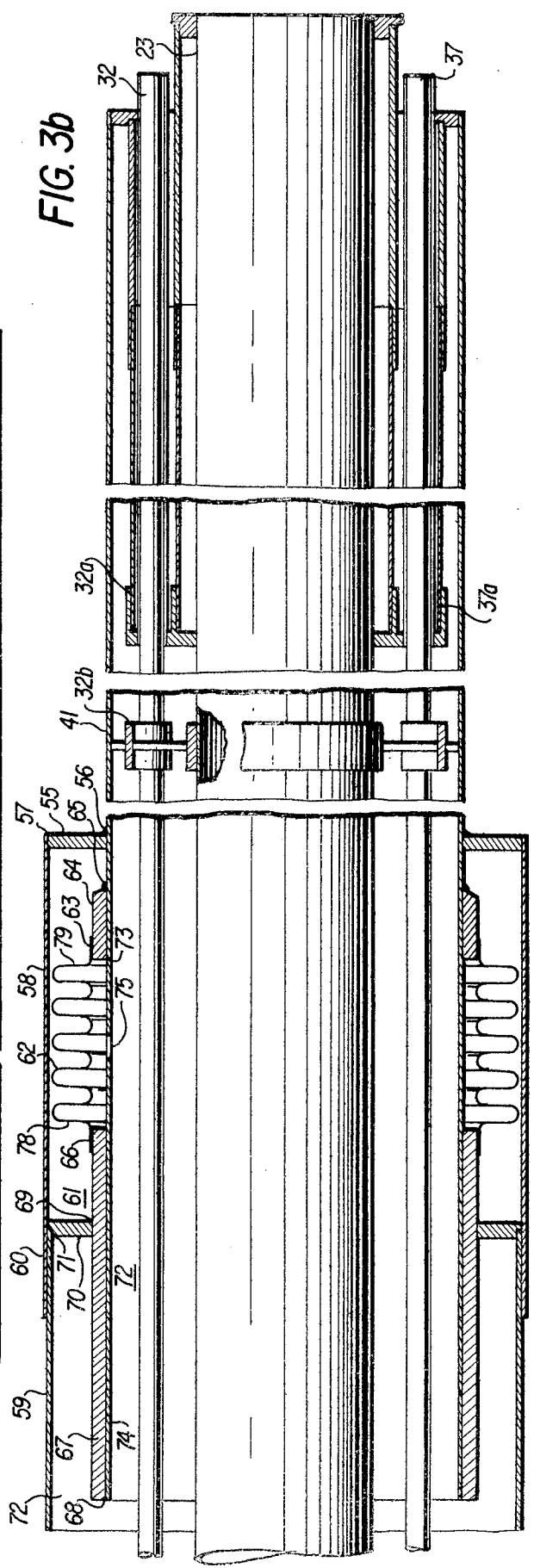

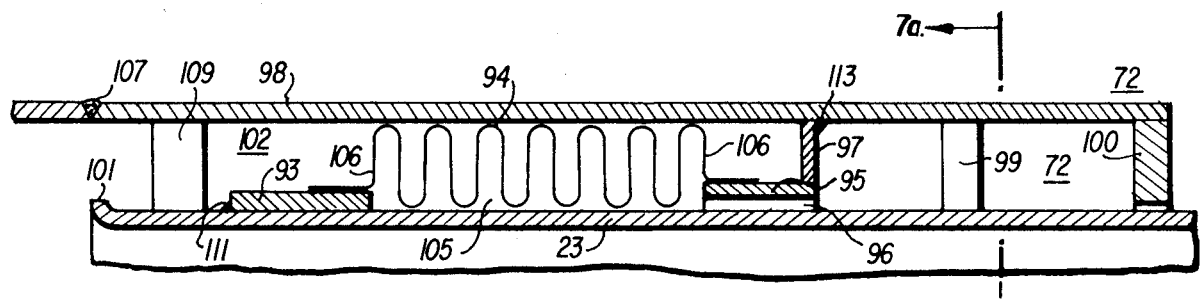
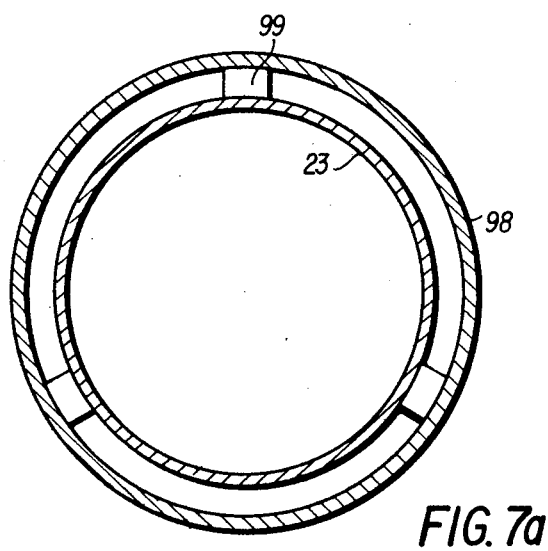
FIG. 7
FIG. 7a

REFRIGERATED CRYOGENIC ENVELOPE

BACKGROUND

This invention relates to a cryogenic envelope for a transmission line. In this respect, a preferred embodiment of the invention will be described in connection with a cryogenic envelope for a flexible superconducting power transmission line.

In order to be commercially attractive, superconductive power transmission lines must have low thermal losses and high reliability. Consequently, it is an object of this invention to provide a transmission line having a cryogenic envelope that is both reliable and results in a low heat-leak structure.

One problem with existing transmission lines is that they tend to buckle or break when either being warmed up for repairs or cooled down upon being placed into operation. Consequently, one of the embodiments about to be described includes structure for permitting various components of the envelope to suitably expand and contract during warm up or cooldown.

Also, for the long distances required for power-transmission lines, a problem is presented by the contraction and expansion of the refrigeration tubes. Hence, another illustrated embodiment describes a refrigeration tube that is expansible or contractible independently of the main envelope.

SUMMARY

In accordance with principles of the invention an inner tube is generally coaxially located within an outer tube so that a portion of the volume therebetween provides a vacuum chamber for holding a vacuum. A refrigeration tube is provided for directing refrigeration into said vacuum chamber at a temperature intermediate the temperatures of the inner and outer tubes. Most of the refrigeration tube runs substantially parallel to the axis of the inner and outer tubes, but an expansion portion thereof is coiled about the inner tube within the vacuum chamber so that the refrigeration tube is permitted to expand or contract along its length during thermal changes.

BRIEF DESCRIPTION OF THE DRAWINGS

The foregoing and other objects, features, and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed on illustrating principles of the invention.

FIG. 3a is a schematic partially sectional view of an expansion-end portion of a dewar assembly.

FIG. 3b is a schematic partially sectional view of the remainder of FIG. 3b's expansion-end portion connected, through broken away portions, to a simple-end section.

FIG. 7 is an enlarged fragmentary view of a portion of an inner-tube-bellows structure illustrated in FIG. 2.

FIG. 7a is a schematic end view of guide spacers adjacent a power cable tube as seen when viewed along the lines a–a in FIG. 7.

DESCRIPTION OF A PREFERRED EMBODIMENT

Figure 1B:
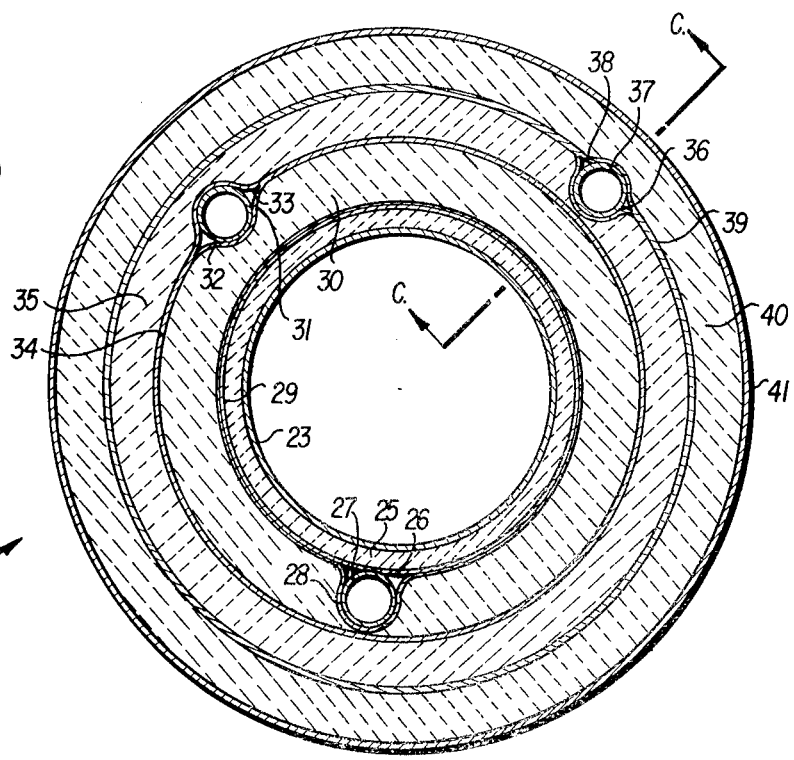
FIG. 1b is a cross sectional view of a segment of a superconducting power-cable dewar assembly.
Figure 1A:
FIG. 1a is a schematic illustration of a multisection cryogenic envelope for a flexible superconducting power transmission line.

In FIG. 1a, a transmission line is housed in a cryogenic envelope comprised of a plurality of straight rigid sections 15, each having an expansion-end portion 16 which can be either joined to another expansion end or joined to a short flexible section 17. FIG. 1b represents a section through a small-diameter portion of a typical rigid section of a superconducting power-cable dewar. The dewar line comprises a stainless steel inner tube 23 which might have about a four inch outer diameter and a 0.035 inch wall thickness. This inner tube serves as the actual support for a superconducting cable (not shown), which the entire assembly functions to contain. In order to promote superconducting characteristics of the contained cable, liquid helium at about 6°K is circulated through the inner support tube — often at a pressure of about 15 atmospheres.

The inner stainless steel helium-containing tube 23 is wrapped with one-quarter inch or so of spirally wrapped multilayer insulation 25. This multilayer insulation generally comprises layers of glass-fiber paper alternating with layers of aluminized Mylar to obtain a layer density of about 44 wraps per inch. Use of the aluminized Mylar minimizes conduction along the length of the spiral wrap, but plain aluminum foil and glass-fiber paper are installed at locations near weld areas so that the Mylar is not burned.

On top of the initial insulation layers is a refrigeration shield comprised of one or more layers of aluminum foil 26 that is about five thousandths of an inch or so thick and spirally wrapped about the length of the line. A first refrigerated line 27 is then installed, and the insulation and tube are wrapped with a second set of aluminum foil layers 28 which are also five thousandths of an inch or so thick. Thus, the shield itself 29 comprises two sets of relatively heavy aluminum foil wrapped in touching contact with the length of the refrigerant line 27. This arrangement provides adequate contact for transfer to the shield 29, while permitting independent motion of the tube 27 relative to the foil layers 26 and 28 to result in a "sliding shield".

In the above regard, the helium that is passed through the inner tube 23 is returned to the helium source, not shown, through the refrigerant tube 27. Hence, the first "sliding shield" 29, comprised of layers 26 and 28, is maintained at a temperature of about 10° K depending upon the temperature rise of the helium as it passes from the source, through the tube 23, and back again to the source through the tube 27.

The first shield is covered with another one-half inch or so of multilayer insulation 30; after which a second "sliding shield" assembly is constructed similar to the first. The second shield comprises spirally wrapped relatively heavy foil 31 on top of which is layed an outgoing or "go" refrigerant line 32. Another layer 33 of the relatively heavy foil is then spirally wrapped along the length of the line over the go refrigerant tube 33. The second shield assembly 34 is then wrapped with another three-quarters inch or so of multilayer insulation 35.

A third shield assembly 39 is comprised of first and second heavy-foil layers 36 and 38 which are wrapped on either side of a "return" refrigerant line 37. Hence, the illustrated structure includes three sliding shields 29, 34, and 39. The first distributes refrigeration through the return tube 27 at about 10° K; the second distributes refrigeration from the "go" tube 32 at about 80° -82° K; and the third distributes refrigeration through the return tube 37 at about 82–105° K. In this connection, the shield 39 intercepts a considerably larger portion of the transfer line's heat leak than do the inner shields 29 and 34. Hence, the larger temperature differential along return tube 37.

The outer heavy-foil layer 38 of the return shield 39 is wrapped with another three-quarters of an inch or so of multilayer insulation 40; and the entire structure is then placed within an outer jacket 41. In this connection, the illustrated embodiment employs an outer jacket 41 of carbon steel material with a ten inch outside diameter and a 0.120 inch wall thickness. Experience indicates that stainless steel outer jackets, when maintained in certain adverse environments, tend to develop "pinholes". Accordingly, when the carbon steel jacket 41 is conventionally wrapped with tarred paper or the like, the reliability of the dewar is not adversely affected, but the structure is markedly less expensive.

A typical cryogenic envelope for superconducting power cables is subjected to wide thermal changes. For example, the outer jacket might be subjected to ambient temperatures from 110°F (570° R) or more to minus 30°F (430° R) or less; and, large contractive forces are also generated when the above described shields are operated at temperatures such as 10° K, 80° K, and 105° K, respectively. When such temperature extremes are involved, one can expect the inner tube 23, for example, to contract about 2 inches over a tube length of about 60 feet. Consequently, such structures require a provision for accommodating the structure's contraction during cool-down; and expansion in the event it becomes necessary to warm up the structure in order to make repairs.

Figure 2:
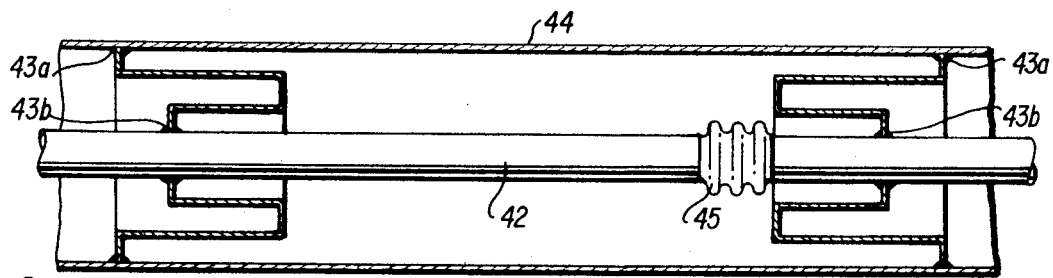
FIG. 2 schematically illustrates a conventional structure for accommodating a transfer line's expansion and contraction.

FIG. 2 illustrates a conventional method of accommodating the contraction of the inner line of a cryogenic line. Therein, a 60 foot length of inner line 42 (corresponding to 23 above) is welded at 43a and 43b to an outer jacket 44. By insertion of bellows 45 into line 42, the contraction which occurs in 42 during cooldown merely causes the bellows 45 to expand and in that manner avoids the creation of excessive forces at welds 43. Where, as here, there is high pressure in the inner line, however, the bellows 45 tends to blow up and expand in diameter so that it ceases to be functional as a thermal movement means. Such problems are eliminated by structure such as that to be described shortly.

Figure 3C:
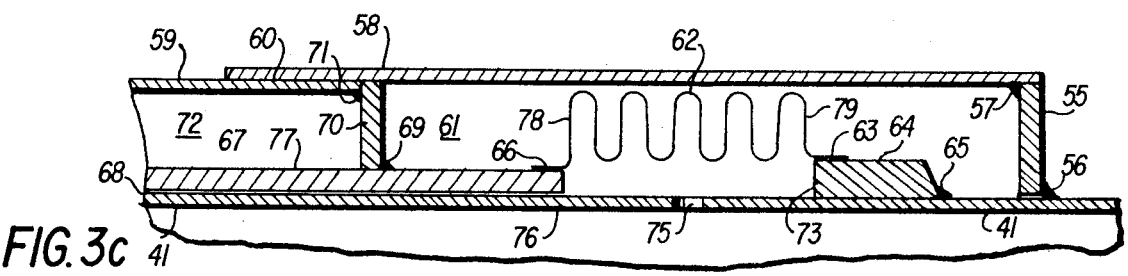
FIG. 3c is an enlarged fragmentary view of a part of the expansion-end portion illustrated in FIG. 3b.

FIGS. 3a and 3b illustrate a cross section through a rigid section 15b in FIG. 1 — FIG. 3a showing part of the expansion-end portion; and FIG. 3b showing the small diameter portion and the remainder of the expansion end portion. In this respect, the expansion end portion will be described from right to left beginning in the middle of FIG. 3b and continuing from the right side of FIG. 3a. Therein, (FIG. 3c) the outer tube 41 is welded to an extension ring 55 at 56. In turn, the extension ring 55 is welded at 57 to an outer protective sleeve 58. This protective sleeve 58 slides over an enlarged outer jacket member 59 at a sliding joint 60 which permits ambient pressure to enter the volume 61 between a stainless steel bellows 62 and the protective sleeve 58. In this regard, one end of the bellows 62 is welded at 63 to an adaptor ring 64 which, in turn, is welded at 65 to the tube 41. The other end of the bellows 62 is welded at 66 to a sleeve 67 which permits that portion of tube 41 to slide within the sleeve. The sleeve 67, however, is welded at 69 to another extension ring 70 which, in turn, is welded at 71 to the enlarged outer jacket 59.

As will be described more fully later, a vacuum is maintained over most of the transfer line's length in the volume 72 between the inner tube 23 and the transfer line's outer walls 41 and 59 (except for volume 61). Consequently, although the bellows 62 is subjected to ambient pressure in its surrounding volume 61, its interior is at a vacuum.

The vacuum in volume 72 may communicate with the inner side of the bellows via the space 68 between line 41 and sleeve 67, as shown in FIG. 3c for example, or communication may be made by a hole 75 in line 41 in the bellows area.

Two of the refrigerant lines 32 and 37 extend from thermal returns such as 32a and support spacers such as 32b (to be described more fully shortly) into a coiled configurations 32c and 37c as illustrated in FIG. 3a. In this connection, for purposes of simplicity, but the tube 27 is similarly coiled. That is the refrigerant line 27 (not shown in FIG. 3) is closely coiled about the inner tube 23; the "go" refrigerant tube 32 is coiled about the tube 27; and the refrigerant return line 37 has the largest coils as illustrated. In this manner, thermal motion of the refrigerant tubes is accommodated by their thusly coiled portions.

Figure 4:
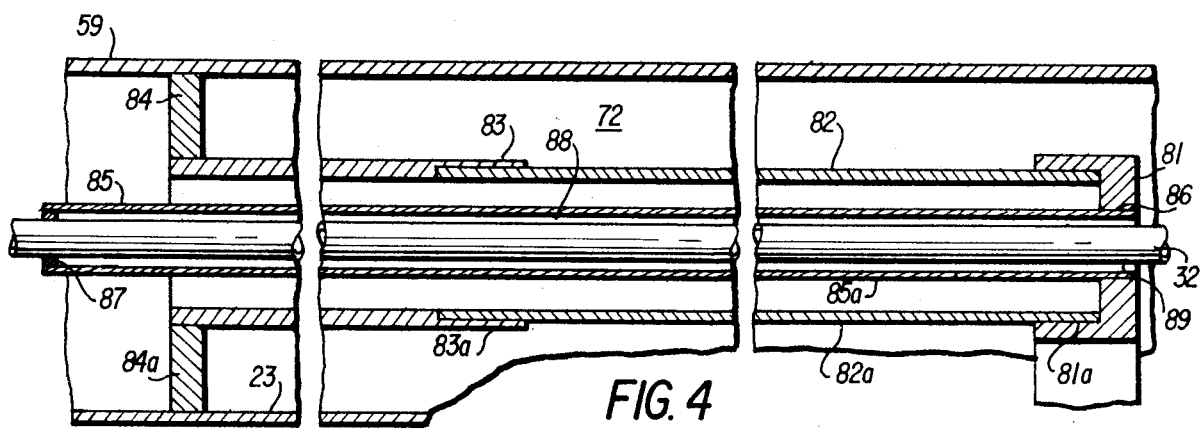
FIG. 4 is an enlarged fragmentary view of a "thermal standoff" portion of the dewar transfer line illustrated in FIGS. 3.

When the three refrigerant tubes pass through the ends of an individual length of transfer line, care must be exercised so that the refrigeration of the tube is not transferred to the transfer line's carbon steel outer jacket. This is because the carbon steel jacket might get brittle and break if it were subjected to the extreme cold of the refrigeration tubes — particularly the 10° R tube 27. Also heat leak to the tubes 32 and 37 would be excessive and would represent a waste of refrigeration. Consequently, as illustrated in FIGS. 3; and in more detail in FIG. 4, the ends of the transfer line sections include "thermal standoff" portions where the refrigeration tubes pass from one transfer line section to another.

Figure 5:
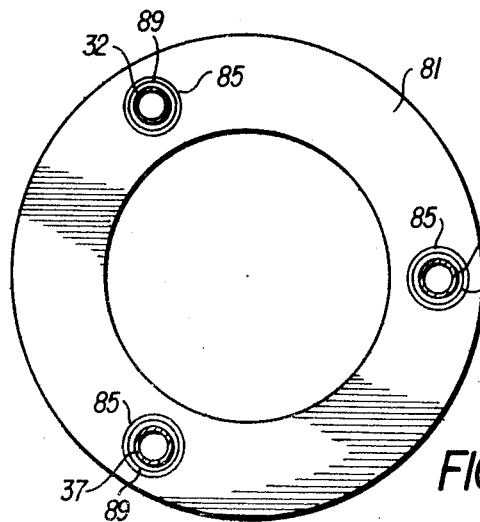
FIG. 5 is a schematic view of the end of an adapter ring partially illustrated in FIG. 4.

In the above regard, the three refrigeration tubes pass through a stainless steel adaptor ring 81, an end view of which is schematically illustrated in FIG. 5. An epoxy fiberglass tube 82, concentric with line 23, is glued to the adaptor ring 81 and extends to the left about fourteen inches or so where it is glued to a similarly sized stainless steel tube 82 which, in turn, is welded to another adaptor ring 84 extending between the tube 83 and the enlarged outer jacket member 59. In this manner, high thermal-resistance heat paths are maintained between the outer shell 59 and the adapter ring surrounding the various refrigeration tubes. In a similar manner, a high thermal-resistance heat path is maintained between the adaptor ring 81 and the inner line 23. In this instance, another epoxy fiberglass tube 82a (also concentric with line 23) is glued to the adaptor ring at 81a and extends to the left about 14 inches or so where it is glued to a similarly sized stainless steel tube 83a which, in turn, is welded to another adaptor ring 84a extending between the tube 83a and inner line 23.

Additionally, the refrigeration tubes such as 32 extend within surrounding supplemental stainless steel tubes 85. These tubes 85 are welded to the adaptor ring 81 such as at 86; and are also welded to the refrigeration line itself at 87.

Figure 6:
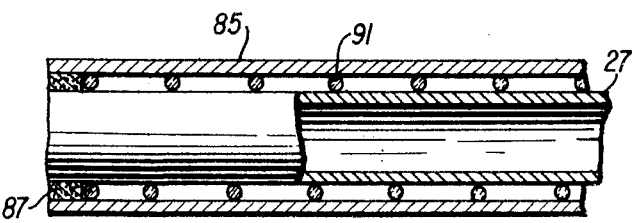
FIG. 6 illustrates a modification of a portion of the structure illustrated in FIG. 4.

A close fit is maintained between refrigerant tubes 32 and 37 and supplemental tubes 85 so that the tubes 32 and 37 effectively refrigerate the adaptor ring 81. For clarity, the drawings have been enlarged, but the tubes 32 and 37 are almost in sliding contact with their enclosing tubes 85 thus maintaining the adaptor ring 81 at substantially the temperature of the warmer refrigerator tube in the range between 80–105° K. The third refrigerant tube 27 (FIG. 6) is separated from its enclosing tube 85 by means of a spirally wrapped separating-cord 91. In this manner, heat transfer from adaptor ring 81 to line 27 is via enclosing tube 85, then the cord 91, made of low conductive glass fibers, and thence to tube 27. Hence, this ensures a long complex heat path between the adaptor ring 81 at a temperature of 80–105° K and the tube 27 carrying refrigerant at about 10° K.

In the above regard, the thermal standoff tubes just described can be of varying lengths. Also, materials other than epoxy-fiberglass and stainless steel can be used. The materials and dimensions should be such, however, that heat leak between ambient air and the 80° K refrigerant tube is les than about 3.5 BTU per hour per square inch of cross section of tube wall material; and less than about 0.25 BTU per hour per square inch of cross section of tube wall material between the 80° K tube and liquid helium temperature. Additionally, although the thermal standoff portions of the transfer line have only been described in connection with the expansion ends of a given line length, it will be understood by those skilled in the art that the opposite ends of the sections of transfer line, such as at 37a in FIG. 3b, are similarly structured.

As indicated above, the inner tube 23 is also equipped with a thermal compensation structure to accommodate thermal movement of the inner tube 23 within the various other portions of the transfer line —as above, "thermal movement" referring to expansion or contract of the tube caused by thermal changes. In this regard, with reference to the left end of FIG. 3a and FIG. 7, a cylindrical adaptor 93 is welded to the inner tube 23 and also to one end of a stainless steel bellows 94. The other end of the bellows 94 is welded to a sliding-ring sleeve 95 which is slightly spaced from the tube 23. In this manner, the vacuum from the volume 72 is free to enter the inside of bellows 94 through the space 96. Another adaptor ring 97 is welded between the sliding-ring sleeve 95 and a bellows retaining sleeve 98; and, as further illustrated in FIG. 7a, relatively rectangular cross-sectioned guide spacers 99 are welded to the outside of the inner tube 23 so that the inner surface of the bellows retaining sleeve 98 slides thereover. Also, a flexure reduction ring 100 is welded to the end of the bellows retaining sleeve 98 to reduce flexure tendencies of the bellows assembly and the tube 23.

Flared end portions 101 of the adjoining tube sections 23 are not sealed. Hence, high pressure helium from witin tube 23 is permitted to enter volume 102 between the retaining sleeve 98 and the bellows 94. Consequently, the bellows 94 is surrounded by high pressure helium while the interior volume 105 of the bellows is exposed to the vacuum of volume 72.

In the above regard, it should be noted that, although adjoining tube sections 23 are not joined (as at the flared portions 101) adjoining portions of the bellows retaining sleeves 98 are welded as at 107 in order to provide the pressure chamber 102. Also, if desired, additional guide spacers such as 109 (similar to 99) can be placed along the tube 23 in the same manner as was described in connection with the guide spacers 99.

In operation, as the inner tube 23 contracts upon cool down, the space at the flared portions 101 of the tube 23 is permitted to increase; and the bellows 94 contracts in order to maintain vacuum-pressure seals at welds 111 and 113 between the inner tube 23 and the bellows adaptor sleeve 98. At the same time, the rigidity of the bellows retaining sleeve 98 prevents the bellows 94 from buckling as do the various guide spacers 99 and 109 and the flexure prevention ring 100.

Support spacers are provided at intervals within the dewar line in order to support the inner tube as well as the refrigerant lines. The support spacers are of two basic types. The more complex spacer is designated by numeral 121 in FIG. 8. In a preferred embodiment of a 60 foot dewar section, there are two complex support members 121 located at 20 foot intervals. Member 121 supports both the inner container 23 and the refrigerant tubes 27, 32 and 37; and comprises an outer aluminum ring 123 and an inner aluminum ring 125 which is installed about the cable-containing tube 23. Three hollow epoxy-fiberglass spokes 129 have titanium tips 131 and extend outwardly from the inner aluminum ring 125 and through the outer ring 123 to the transfer line's outer shell 41. In this manner, the central conduit 23 is centrally supported within the composite structure by means of the low thermally conductive spokes 129 and the inner ring 125.

Figure 8:
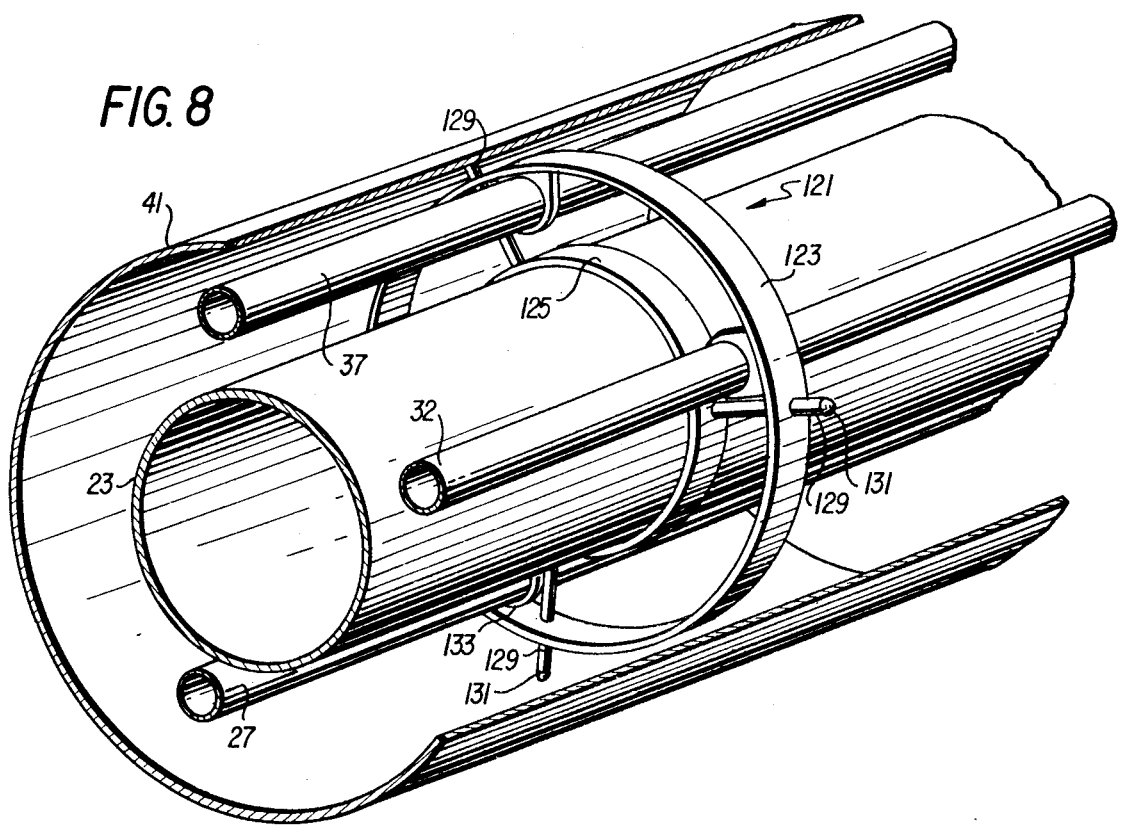
FIG. 8 is a pictorial view of a power-cable dewar including a support for a power-cable tube and refrigerant lines.
Figure 8A:
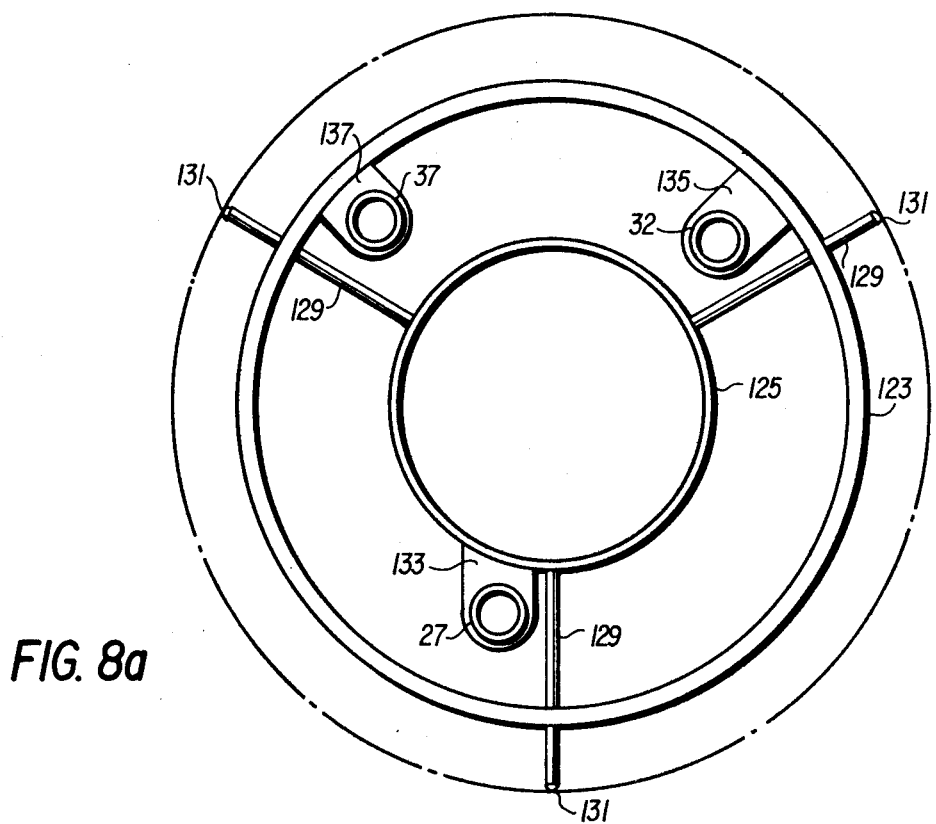
FIG. 8a is an end view of a support ring shown in FIG. 8.

Referring now to FIG. 8a the refrigerant tube 27 is supported by an epoxy fiberglass projection 133 which is affixed to the inner ring 125. Similarly, the refrigerant line 32 is supported by an epoxy fiberglass projection 135 affixed to the outer ring 123; and the refrigerant line 37 is supported by a somewhat shorter epoxy fiberglass projection 137 which extends inwardly from the outer aluminum ring 123. Hence, merely by adjusting the size and location of the projections, the tubes can be spaced at selected radial distances from the central conduit 27 and at selected circumferential locations around the conduit.

By means of the FIG. 8 structure, refrigeration in the 10° K refrigeration line 27 is isolated from the inner ring 125; and, because of the low thermally-conductive nature of the spokes 129, the inner ring's refrigeration is not effectively transmitted to the outer ring 123. The 80° K refrigeration line 32 and the 105° K refrigeration line 37 are directly affixed to the outer ring 123, but because the low thermally-conductive projection 135 is longer than the low thermally-conductive projection 137, a relatively small amount of the "go" refrigeration tube's cold is transmitted to the outer ring 123.

In operation, the support spokes 129 are loaded in compression with only two of the spokes touching the inner surfaces of the outer jacket 41 (in some cases only one spoke might touch). Hence, there is a lower heat leak to the outer ring 123 than if all three of the spokes touched the outer jacket. Also, the titanium tips 131 on the spokes 129 permit them to be slid into the outer jacket 41 during construction without unduly abrading the inner surface of the outer jacket 41 or wearing down the spokes.

Figure 9:
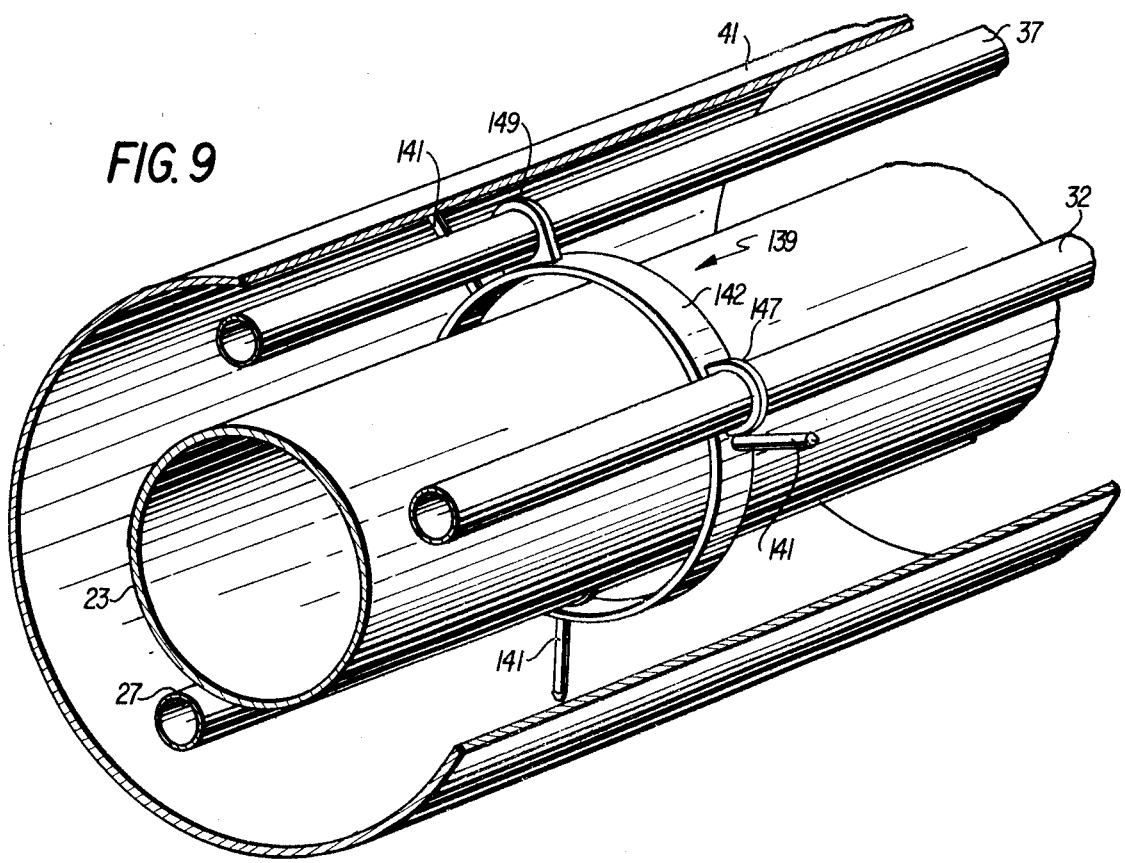
FIG. 9 is a pictorial view of another support assembly for supporting only the refrigerant lines.
Figure 9A:
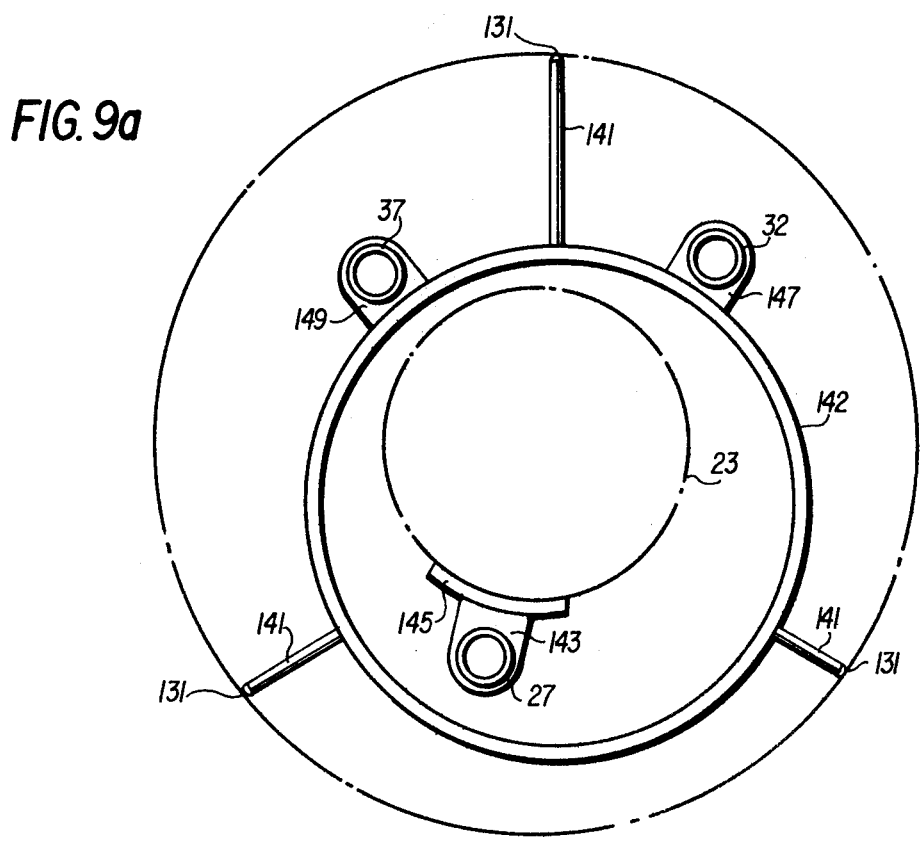
FIG. 9a is an end view of a support ring shown in FIG. 9.

The refrigerant lines 27, 32 and 37 are also supported by intermediate supports 139 at about 10 foot intervals as illustrated in FIG. 9. Therein, titanium tipped hollow epoxy fiberglass spokes 141 are affixed to an aluminum ring 142 which surrounds, but does not touch, the inner conduit 23. In this manner, there is no heat transfer from the inner conduit 23 through the intermediate support rings 139 to the outer jacket 41. In this respect, the illustrated spokes 141 are of varying lengths (FIG. 9a) so that the support member 139 can be eccentrically located to accommodate the various refrigerant lines as will now be discussed.

An epoxy fiberglass projection 143 is fastened to the outer surface of the inner conduit 23 by means of a suitable pad or projection 145. This projection 143 supports the 10° K refrigeration line in a manner so that it does not touch the aluminum ring 142. Hence, none of refrigeration line 27's cold is transmitted to the support member 139. The other two refrigeration lines, on the other hand, are supported by projections 147 and 149 which are also constructed of a low thermally-conductive epoxy fiberglass and affixed to the outside of the support ring 142. With this arrangement there is no heat leak via the supports to the inner line 23, and, as before, the heat leak to the ring 142 is minimal because of the low conductivity of the spoke or spokes which contact the outer vacuum jacket. Also, as above, the refrigerant tubes can be selectively radially and circumferentially spaced with respect to the main conduit 23.

Figure 1C:
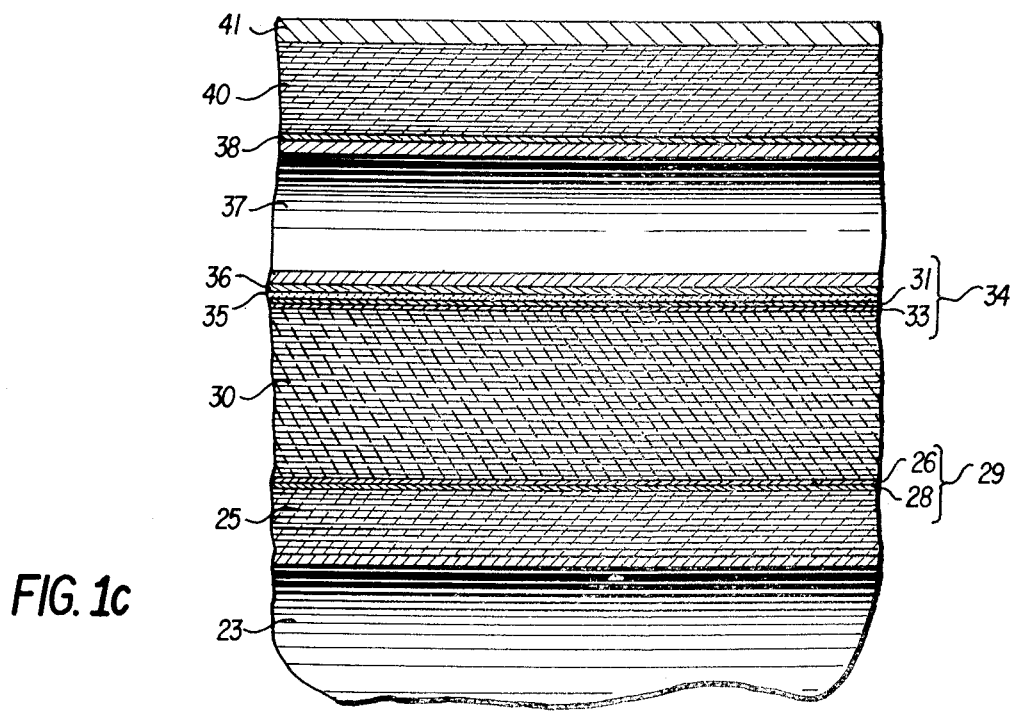
FIG. 1c is a sectional view of FIG. 1b taken along the lines c—c thereof.
Figure 10:
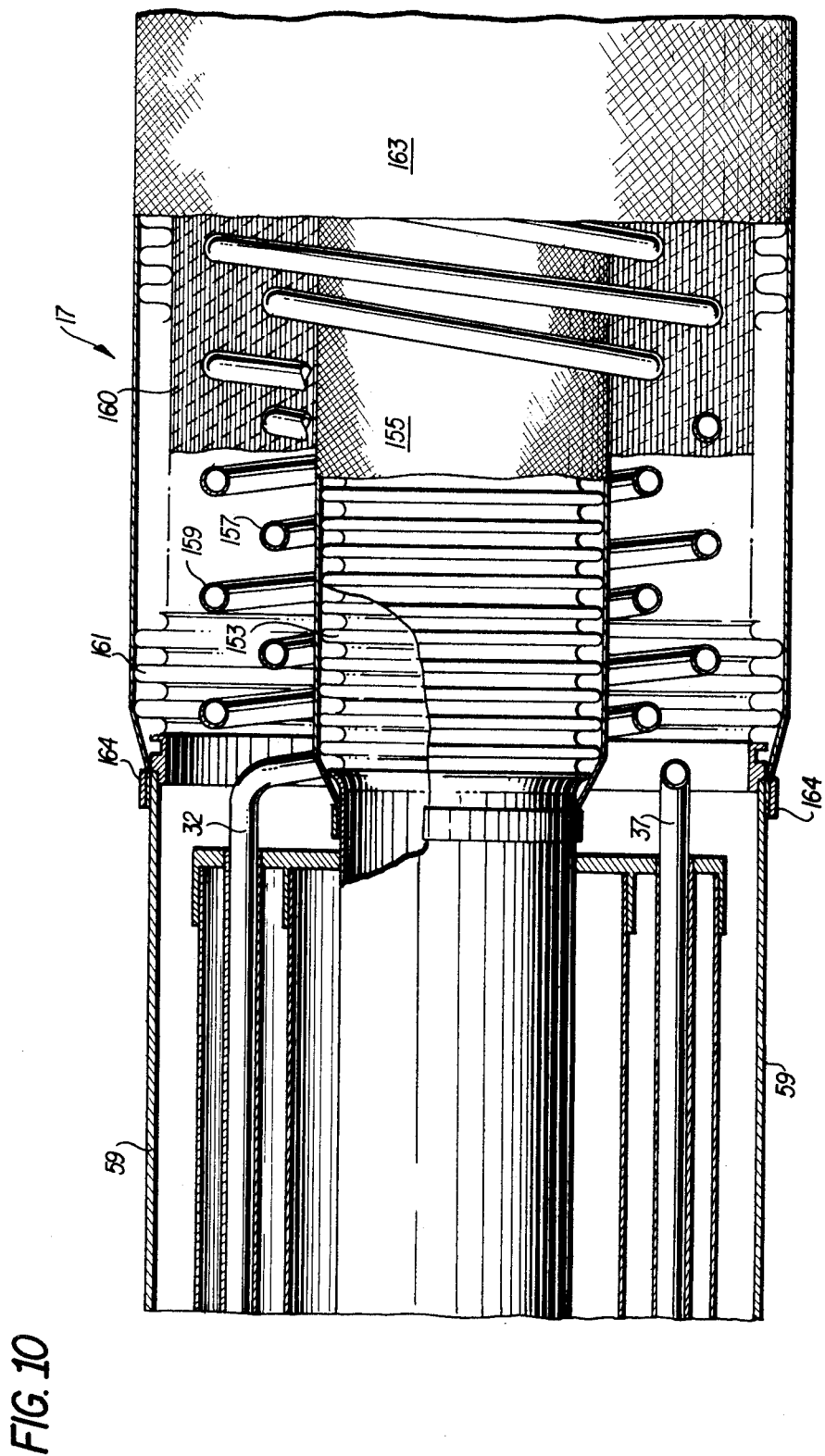
FIG. 10 is a schematic partially sectional view of a flexible section of a superconducting cable dewar assembly.

FIG. 10 is a more detailed illustration of a short flexible line section designated by numeral 17 in FIG. 1. These flexible dewar line sections permit modest changes of direction of the line, in the range of about 20° to 30° . Relatively short flexible sections are used, because it has been determined that using shorter sections by themselves, rather than as part of a longer section, minimizes lateral forces which tend to increase the number of spacers and/or increase the size of the support members.

The flexible section 17 basically comprises two rigid ends having the same outer diameter as the expansion ends described above. Thus a flexible section might be comprised of two rigid ends each approximately two feet long with a six foot long flexible portion between these ends. The rigid ends are designed to mate with the expansion ends of the rigid-line sections so that complete flexible sections may be installed as required as shown in FIG. 1a to provide overall line flexibility. In this respect, FIG. 10 is a partially cut-away side view of a short flexible line section 17 without complete end assembly details. The inner line is made flexible by use of a suitable flexible section made of cnventional flex hose 153 wrapped with an external braid 155 to restrain the flexible hose and permit it to withstand operating pressures.

To provide for thermal expansion, the refrigerant tubes are made flexible in a manner similar to that utilized in the thermal expansion sections (FIG. 3a). Specifically, the refrigerant tubes such as illustrated by coils 157 and 159 of tubes 32 and 37, are wound into helical coils with the respective coil diameters of the lines being such that they are spaced from the inner pipe and also have room for the laminated insulation 160 between them. Although not illustrated, tube 27 of FIG. 9 is also thusly coiled.

The outer vacuum jacket also comprises a flexible line made of a conventional flex hose 161 wrapped with an external braid 163, which serves primarily to protect the convolutions of the flex hose from damage. Since there is a greater need for space required by the flex hoses, coiled tubes, and insulation; the inside diameter of the outer flex hose is about the same as an expansion end section as noted above.

Each of the illustrated 60 foot dewar line sections is provided with two vacuum pump-out ports located approximately 15 feet from each end, so that the maximum pumping path for each port does not exceed about 15 feet.

Two basic types of pump-out devices are provided. One provides only a pump-out function while the other includes a relief device. In one preferred embodiment each main dewar line section contains one of each, while each field joint section (to be described shortly) includes a pump-out having a relief device.

Figure 11:
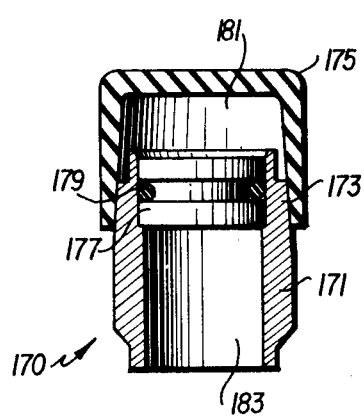
FIG. 11 is a partially sectional view of a pumpout valve suitable for use with a dewar relating to the invention.

A pump-out valve 170 is depicted in FIG. 11 and comprises a housing 171 threaded on its outer end 173 to accept a threaded protective cap 175 which is sealed vacuum-tight with teflon tape, not shown. The outward opening of the pump-out housing is provided with a pump-out valve plug 177, which is sealed with an O-ring 179. It is the function of the protective cap to prevent continuing entry of air, thus avoiding oxidation of the O-ring. Hence, it is desirable that the void volume 131 between the cap and the O-ring is kept to a minimum. In the event the O-ring should develop a leak, only the volume of air 181 will enter the system; this minor amount would readily be cryopumped. The non-threaded end of the pump-out device is sealed into the outer jacket of the dewar line, such that its inner opening 183 is in communication with the internal dewar line structure.

Figure 12:
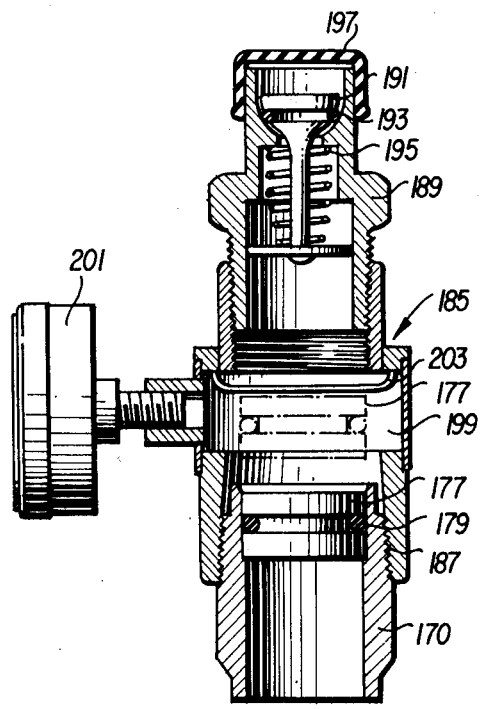
FIG. 12 is a partially sectional view of a pumpout valve section equipped with a relief assembly.

FIG. 12 illustrates a pump-out unit 170 equipped with a relief assembly. Therein, an adapter housing 185 is threaded at 187 onto the pump-out device in place of the protective cap 175. A relief valve 189 is in turn threaded into the opposite end of the adapter housing and comprises a valve plug 191 sealed within the valve opening by O-ring 193. This valve plug is held in place by internal biasing spring 195; and dust cap 197 is snap-fitted over the outside opening of the relief valve to protect it from air, moisture, and dirt.

Adapter housing 185 has a suitable internal volume so that the plug 177 of the pump-out unit is capable of moving upwards to permit gas to pass around it as shown in Phantom in FIG. 12. The relief valve 189 can be pumped so that the volume 199 between the pump out plug O-ring 179 and the relief valve 189 is evacuated. In this regard, the housing 185 is fitted with a Bourdon tube vacuum gauge 201, which is set in contact with the internal volume 199 of the housing. This gauge serves to indicate whether there is a vacuum leak at the O-ring 179, or whether the plug 177 has been pushed out during a warm-up cycle.

In the event of a pressure rise, valve plug 177 is unseated from its sealed position and emerges into the volume 199 of the adapter housing 185, where it is supported by a blow-out support member 203. If the pressure rise is sufficient to unseat relief valve 191 against the bias of spring 195, protective cap 197 readily pops off to provide pressure relief.

When the relief valve is pumped-out and the pump is removed, a small amount of air may enter the volume including 199 between the pump-out plug O-ring 179 and the relief valve 199, such that the final pressure of the internal volume of the housing might approximate 5000 microns. This, however, does not significantly adversely affect the transfer line's operation.

Figure 13:
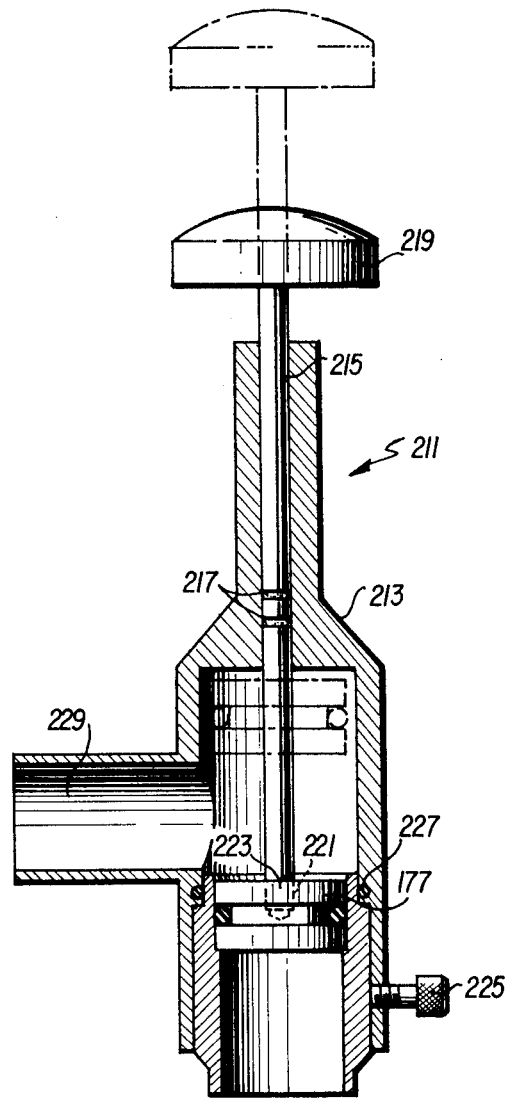
FIG. 13 is a partially sectional view of a vacuum pump-out operator means.

A vacuum pump-out operator designed to attach to a pump-out assembly is depicted in FIG. 13; and a similar operator is used in connection with the relief valve. The vacuum pump-out operator 211 includes an operator housing 213 fitted with an operator stem 215 movably sealed within the housing by O-rings 217. The stem can be axially maneuvered within the housing through manipulation of operator knob 219. The valve plug 177 (and relief valve 191) is provided with a centrally threaded anchor hole 221 to which a threaded tip 223 of the operator stem is secured.

In operation, the operator housing is slid over the pump out housing and is secured to the pump-out housing by a fastening screw 225, with an O-ring 227 accomplishing a seal between the two housings. The operator stem 215 is then pushed inwardly until it mates with the threaded opening 221 in the valve plug 177. Once the stem 215 is threaded into the valve plug hole it is pulled outwardly, thus removing the valve plug 177 from its sealed position so that a vacuum port 229 communicates with the internal volume of the pump-out device and, through the valve, with the internal volume of the dewar line assembly.

Figure 14:
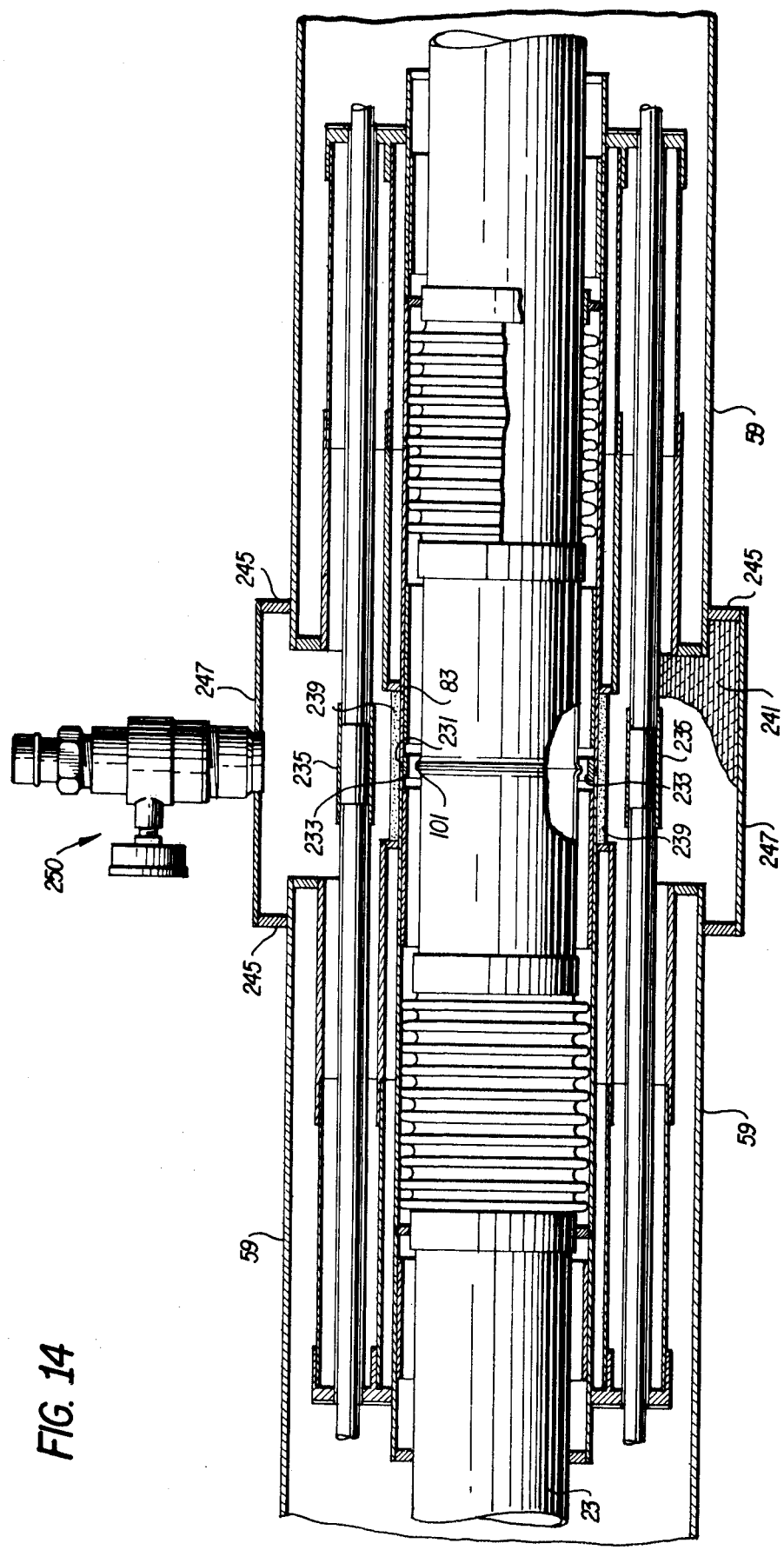
FIG. 14 is a schematic, partially sectional view of a field-joint arrangement between two expansion end sections.

Assembling a line several miles long or even several thousand feet in length results in the field joining of factory-built dewar line sections. FIG. 14 illustrates a structure for accomplishing these field joints. In this respect, as noted above in connection with FIG. 7, the ends 101 of the cable conduit 23 are flared. Hence, there is little possibility for a superconducting cable to catch on the inner joints as the cable is pulled through the conduit 23. Moreover, the ends 101 are not joined as such. Consequently, there is not even any welding residue for the cable to snag upon. The remaining elements of the section ends are joined together, however, as will be described with reference to FIG. 14.

For joining the thermal expansion ends of the dewar line, the stainless steel standoff sleeves 83 are fastened by butt weld 231 provided with backup ring 233. This arrangement results in two particularly desirable features. Welding of the sleeve eliminates the need for a rough surfaced backup ring located in the inner line 23; and, as noted above, the openings occurring at the joined ends 101 of the flared inner line 23 permit the flow of helium from the inner container 23, to the outside volume 102 of the inner line expansion bellows 92.

After the weld 231 has been completed, the refrigerant tubes 27, 32, and 37 are joined by means of couplings such as 235, which are silver soldered to the respective refrigerant line ends.

Prior to connecting the outer carbon-steel vacuum jacket sections 59, adsorbent and chemical getters such as 239 are added and the joint is suitably insulated throughout with multilayer insulation 241. In this respect, charcoal or the like is placed adjacent the surface of the inner helium line 23 to getter oxygen and nitrogen; and a small amount of palladium oxide or the like is placed in the vicinity of the transfer line's warm outer jacket 59 to properly getter hydrogen gas. These getter substances are installed in both the shop-fabricated evacuated sections; and in the field-evacuated joints.

The outer vacuum jackets 59 are provided with adapters 245 over which sleeve sections 247 are positioned. The outer pipes are then effectively joined such as by welding, and the joint spaces thereby sealed.

After the entire field joint has been completed, the volume within the joint is field evacuated and sealed off with vacuum seal and relief devices 250 such as described above in connection with FIGS. 11–13.

In sizing the tubes carrying the refrigerant, an allowable temperature rise is selected for the refrigerant gas, which, in effect, determines the maximum temperature of the outer shield. For 2,500 feet of 4-inch diameter inner line, for example the refrigeration requirement at a nominal outer shield temperature of 80°K is 1,187 BTU per hour. If a temperature rise of 31° K is allowed, then the amount of helium refrigerant required in pounds of helium per hour equals $1,187/(56 \times 1.4) =$ 15 pounds/hour of helium. Under these conditions the pressure drop in a one-half inch inner diameter refrigerant line is 7.9 psi on the go run and 11.2 psi on the return run for helium at inlet conditions of 80 psi and 136° R. Since the bulk of the heat load is to the warmer shield, the temperature rise of the helium in the go run is only a few degrees with the balance of the rise occurring in the return run. At the end of the transmission line near a refrigerator unit, the temperature difference between the two refrigerant lines is about 50°R, while, at the distant end, the temperature of the two lines will be virtually the same.

Not only does the innermost refrigerant line 27 provide a convenient means for returning cold helium to its source, but also the use of this line reduces the required flow of coolant helium, since it reduces the heat leak actually reaching the inner line to almost zero. Thus, the helium flow in line 27 is only that required to remove the electrical heat losses at the allowable temperature rise within the inner container. The helium flowing in this return line, however, is permitted to rise above the maximum temperature allowed in the container 23 itself in order to accommodate the heat flux resulting from heat transfer from the 80°K shield.

The above described structures result in a transfer line having heat fluxes that are considerably less than comparably sized transfer lines that are presently commercially available. For example, the overall heat flux on the above described rigid line is only about one-quarter to one-third that of a presently available commercial structure; and the heat flux to the above described flexible sections are about comparable to the same commercial structure.

While the invention has been particularly shown and described with reference to preferred embodiments thereof, it will be understood by those skilled in the art that various changes in form and detail may be made therein without departing from the spirit and scope of the invention. For example, various types of cryogenic insulation can be inserted into the transfer line's vacuum spaces; and, particularly where it is not desired to recover the refrigerant gases in tubes 32 and 37, it might be desirable to circulate liquid nitrogoen therethrough rather than gaseous helium as described above.

The embodiments of the invention in which an exclusive property or privilege is claimed are defined as follows:

1. An elongated cryogenic envelope comprising:
 an inner tube;
 an outer tube generally coaxial with said inner tube;
 means for supporting said inner tube within said outer tube, at least a portion of the volume between said inner tube and said outer tube providing a vacuum chamber for holding a vacuum;
 refrigeration means for directing refrigeration into said vacuum chamber at a temperature intermediate the temperatures of said inner and outer tubes; said refrigeration means including a plurality of refrigeration tubes each having a main portion thereof running substantially parallel to said inner and outer tubes and an expansion portion thereof coiled about said inner tube within said vacuum chamber, said coiled portions being operative to permit said refrigeration tubes to expand or contract along the lengths thereof during thermal changes, each of said refrigeration tubes being located at different selected radial distances between said inner and outer tubes.

2. The envelope of claim 1 including means affixed to said inner tube for permitting said inner tube to expand or contract during thermal changes.

3. The envelope of claim 1 including means affixed to said outer tube for permitting said outer tube to expand or contract during thermal changes.

4. The envelope of claim 3 including means affixed to said inner tube for permitting said inner tube to expand or contract during thermal changes.

5. The envelope of claim 1 including shield means located in said vacuum chamber forming a refrigeration shield intermediate said inner and outer tubes and wherein said refrigeration means directs said refrigeration to said shield to maintain said shield at a temperature intermediate the temperatures of said inner and outer tubes.

6. The envelope of claim 5 including means affixed to said inner tube for permitting said inner tube to expand or contract during thermal changes.

7. The envelope of claim 5 including means affixed to said outer tube for permitting said outer tube to expand or contract during thermal changes.

8. The envelope of claim 7 including means affixed to said inner tube for permitting said inner tube to expand or contract during thermal changes.

* * * * *